United States Patent
Bailey

(10) Patent No.: US 7,833,946 B2
(45) Date of Patent: Nov. 16, 2010

(54) WATER-BASED DRILLING FLUID

(75) Inventor: Louise Bailey, Cambridgeshire (GB)

(73) Assignee: M-I, L.L.C., Houston, TX (US)

( * ) Notice: Subject to any disclaimer, the term of this patent is extended or adjusted under 35 U.S.C. 154(b) by 207 days.

(21) Appl. No.: 12/027,613

(22) Filed: Feb. 7, 2008

(65) Prior Publication Data
US 2009/0042746 A1 Feb. 12, 2009

(30) Foreign Application Priority Data
Feb. 8, 2007 (GB) ................................. 0702445.8

(51) Int. Cl.
C09K 8/06 (2006.01)
C09K 8/60 (2006.01)
E21B 37/06 (2006.01)
E21B 21/00 (2006.01)

(52) U.S. Cl. ........................ 507/136; 507/261; 166/304; 166/312

(58) Field of Classification Search ................... 507/136, 507/261; 166/304, 312
See application file for complete search history.

(56) References Cited

U.S. PATENT DOCUMENTS

| | | | |
|---|---|---|---|
| 3,236,769 A | 2/1966 | Burdyn et al. | |
| 3,396,105 A | 8/1968 | Burdyn et al. | |
| 4,301,016 A | 11/1981 | Carriere et al. | |
| 4,384,096 A | 5/1983 | Sonnabend | |
| 4,385,155 A | 5/1983 | Michaels | |
| 4,425,461 A | 1/1984 | Turner et al. | |
| 4,486,316 A | 12/1984 | Carriere et al. | |
| 4,525,522 A | 6/1985 | Turner et al. | |
| 4,537,688 A | 8/1985 | Peiffer et al. | |
| 4,579,669 A | 4/1986 | Walker et al. | |
| 4,600,515 A | 7/1986 | Gleason et al. | |
| 4,657,943 A | 4/1987 | Wietsma | |
| 4,670,501 A | 6/1987 | Dymond et al. | |
| 4,740,319 A | 4/1988 | Patel et al. | |
| 4,777,200 A | 10/1988 | Dymond et al. | |
| 4,828,724 A | 5/1989 | Davidson | |
| RE33,008 E | 8/1989 | Ruffner et al. | |
| 4,978,461 A | 12/1990 | Peiffer et al. | |
| 5,007,489 A * | 4/1991 | Enright et al. | ................. 175/65 |
| 5,518,996 A | 5/1996 | Maroy et al. | |
| 5,588,488 A | 12/1996 | Vijn et al. | |
| 5,741,761 A | 4/1998 | Varadaraj | |
| 5,770,760 A | 6/1998 | Robinson | |
| 5,913,364 A | 6/1999 | Sweatman | |
| 5,964,692 A | 10/1999 | Blezard et al. | |
| 6,063,737 A * | 5/2000 | Haberman et al. | .......... 507/261 |
| 6,258,757 B1 | 7/2001 | Sweatman et al. | |
| 6,715,568 B1 | 4/2004 | Bailey | |
| 7,338,922 B2 | 3/2008 | Van Der Kooij et al. | |
| 2003/0022987 A1 | 1/2003 | Matz et al. | |
| 2004/0116304 A1 * | 6/2004 | Wu et al. | .................. 507/100 |
| 2005/0049150 A1 | 3/2005 | Patel et al. | |

FOREIGN PATENT DOCUMENTS

| | | |
|---|---|---|
| DE | 201478 | 4/1987 |
| EP | 0070075 | 1/1987 |
| EP | 0875657 | 11/1998 |
| EP | 0875658 | 11/1998 |
| EP | 1024154 | 8/2008 |
| GB | 2297774 | 8/1996 |
| GB | 2131067 | 6/1998 |
| WO | WO96/24646 | 8/1996 |
| WO | WO01/05365 | 1/2001 |

OTHER PUBLICATIONS

L. Bailey et al., "New Insight into the Mechanisms for Shale Inhibition Using Water Based Silicate Drilling Fluids," IADC/SPE Drilling Conf., Dallas, TX, Mar. 3-6, 1998.
C.M.Blow et al., "Raw Polymeric Materials," Rubber Technology and Manufacture (1982) p. 96.
L.J. Fraser et al, "Mechanistic Investigation of the Formation Damaging Characteristics of Mixed Metal Hydroxide Drill-In Fluids and Comparison With Polymer-Base Fluids," SPE 30501 SPE Annual Tech. Conf., and Exhibition, Dallas, TX, Oct. 22-25, 1995.

* cited by examiner

Primary Examiner—Timothy J. Kugel
Assistant Examiner—Aiqun Li
(74) Attorney, Agent, or Firm—Dann, Dorfman, Herrell and Skillman, P.C.

(57) ABSTRACT

A water based drilling fluid contains as additive one or more alkyl ethoxylates having the formula $RO(CH_2CH_2O)_nH$;
wherein:
R is a $C_{16-22}$ alkyl group (preferably R is aliphatic and more preferably R is linear), and
n is an integer in the range 2-30.

Figure 1:
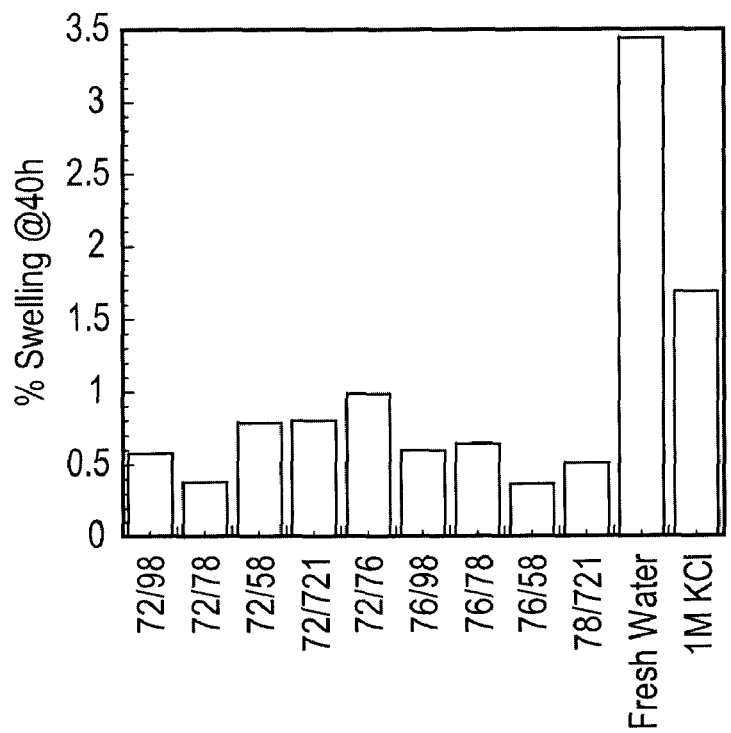

The fluid further contains one or more viscosifying agents, and is substantially clay-free.

10 Claims, 3 Drawing Sheets

WATER-BASED DRILLING FLUID

This invention concerns drilling fluids, particularly water-based drilling fluids.

Drilling fluids are used in well drilling operations, e.g. during drilling of oil and gas wells.

During drilling, drilling fluid is pumped down a drill string, discharged through ports in the drill bit and returned to the surface via the annulus between the drill pipe and the surrounding formation. The drilling fluid performs a variety of functions including cooling and lubricating the drill bit and drill string, removing rock cuttings generated during the drilling process and carrying them to the surface, suspending cuttings in the annulus when pumping stops, preventing squeezing in or caving of the formation and keeping formation fluids at bay.

Drilling fluids generally comprise a carrier, a weighting agent and chemical additives.

Drilling fluids fall into two main categories: water-based drilling fluids, also known as water based muds (WBMs), in which the carrier is an aqueous medium; and oil-based drilling fluids, also known as oil-based muds (OBMs), in which the carrier is oil. OBMs are generally technically superior to WBMs in certain important respects, including the comparative lack of adverse reactivity of OBMs with shales, one of the most commonly encountered rock types during drilling for oil and gas. Use of OBMs, however, has the disadvantage of resulting in production of large quantities of oil-contaminated waste products such as cuttings that are difficult to dispose of in an environmentally acceptable way. While use of WBMs is environmentally more acceptable than OBMs, the performance of WBMs, particularly when drilling through water sensitive rocks such as shales, is technically inferior to that of OBMs. Shales exhibit great affinity for water, and adsorption of water by shales causes the shale to swell and produces chemical changes in the rock which produce stresses that weaken the formation, possibly leading to erosion of the borehole or loss of structure. This can lead to drilling problems such as stuck pipe. In addition inferior well bore quality may hinder logging and completion operations.

Much effort has been put into improving the performance of WBMs relative to shales, namely improving the level of so called shale inhibition of WBMs. Various chemical additives have been incorporated in WBMs in attempts to improve shale inhibition.

One of the most inhibitive WBMs in commercial use is based on silicate systems, and is typified by M-I Swaco's SILDRIL. In terms of inhibition (control of both wellbore stability and cuttings dispersion), these muds are not as effective as OBMs but are significantly better than other WBM, including glycols. However, silicate muds suffer from several drawbacks, including health and safety concerns (due to their high pH), poor thermal stability and lubricity, intolerance to contamination, high maintenance costs, detrimental effects on some downhole equipment, and potential for causing formation damage.

U.S. Pat. No. 4,828,724 describes a WBM based on ethoxylate amines, diamines or quaternary ethoxylated ammonium salts. The WBM makes use of a cationic surfactant to promote adsorption of emulsion droplets onto the shale, creating an oily layer. The electrolyte is usually potassium chloride.

Water soluble glycols or polyols (i.e. molecules containing more than one hydroxyl groups) are widely used chemical additives for improved shale inhibition in WBMs.

U.S. Pat. No. 3,396,105 proposes alkyl ethoxylate additives for shale control in clay-containing WBMs. WO 96/24646 discloses the use of alcohol ethoxylates as additives for WBMs.

The terms "hydrocarbo" and "hydrocarbyl", when used herein, pertain to compounds and/or groups which have only carbon and hydrogen atoms.

The term "aliphatic", when used herein, pertains to compounds and/or groups which are linear or branched, but not cyclic.

The term "alkyl", as used herein, pertains to a monovalent moiety obtained by removing a hydrogen atom from a carbon atom of a hydrocarbon compound which may be aliphatic, and which may be saturated or unsaturated (e.g., partially unsaturated, fully unsaturated). In the context of alkyl groups, the prefixes (e.g. $C_{1-4}$, $C_{2-7}$ etc.) denote the number of carbon atoms, or range of number of carbon atoms. For example, the term "$C_{1-4}$alkyl" as used herein, pertains to an alkyl group having from 1 to 4 carbon atoms. Second prefixes (if present) denote the number of unsaturated (i.e. double or triple) bonds in the alkyl group.

"Hydrophilic-lipophilic balance value" (HLB) of a non-ionic surfactant (such as an alkyl ethoxylate) is given by the formula HLB=20 (Mh/M), where Mh is the molecular mass of the hydrophilic portion of the molecule (i.e. the ethoxylate portion of an alkyl ethoxylate) and M is molecular mass of the entire molecule. For a blend of two or more non-ionic surfactants, the combined HLB of the surfactants in the blend is given by combining the HLBs of the respective individual surfactants in proportion to their mass fractions in the blend. Thus the combined HLB of a blend of surfactant A and surfactant B, where the mass of surfactant A in the blend is twice that of surfactant B is, $HLB_{Blend}=(2HLB_A+HLB_B)/3$.

In general terms, the present invention provides a water based drilling fluid containing as additive one or more alkyl ethoxylate surfactants having alkyl groups with relatively high carbon chain lengths and with low to moderate degrees of ethoxylation.

The ethoxlate groups of such a surfactant are believed to promote absorption of the surfactant onto shale, while the packing of the alkyl chains provides a hydrophobic barrier which reduces ion transport.

Thus, in a first aspect, the present invention provides a water based drilling fluid containing as additive one or more alkyl ethoxylates having the formula $RO(CH_2CH_2O)_nH$;
wherein:
R is a $C_{16-22}$alkyl group (preferably R is aliphatic and more preferably R is linear), and
n is an integer in the range 2-30;
the fluid further containing one or more viscosifying agents, and being substantially clay-free.

Preferably the drilling fluid is substantially free of mineral viscosifiers. R may be a $C_{16-18}$alkyl group. n may be in the range 2-21.

Such a fluid can provide high levels of shale inhibition, matching WBMs based on silicate systems and approaching the performance of OBMs. The fluid appears to mimic an OBM by setting up an osmotic membrane that controls ion movement, thereby restricting water invasion.

Further, the fluid should compare favourably with known drilling fluids in terms of toxicity, biodegradation and bioaccumulation.

The concentration in the fluid of the one or more alkyl ethoxylates may be in the range 1-5 g/l, and is preferably in the range 2-4 g/l. More preferably the concentration is about 3 g/l.

The one or more alkyl ethoxylates may have a combined HLB of less than 16 and preferably less than 9. Avoiding high HLBs helps to reduce problems of frothing and foaming. The one or more alkyl ethoxylates may have a combined HLB of more than 4 and preferably more than 6.

Typically, the surfactants will then be present above the critical micelle concentration (~$10^{-5}$ g/l), and will aggregate into structured mesophases, either micelles, liposomes or lamellae, which present a hydrophilic surface to the solution and an oleophilic or hydrophobic core. The ethoxylate groups can adsorb on the surface of clays and shales, as do lower molecular weight glycols, thus building a surface coating with an internal oleophilic character. In OBM, salt tends not diffuse out of emulsion droplets, and likewise electrolyte ions are hindered from diffusing into the shale by their poor solubility in this olephilic medium.

The drilling fluid may contain two alkyl ethoxylates with different hydrophilic-lipophilic balance values. The concentration in g/l of the alkyl ethoxylate with the lower hydrophilic-lipophilic balance value is then preferably at least 1.5 times greater than the concentration in g/l of the alkyl ethoxylate with the higher hydrophilic-lipophilic balance value. Thus, for example, the drilling fluid may contain a mixture of polyoxyethylene(2) stearyl ether (HLB=4.9) and polyoxyethylene(10) stearyl ether (HLB=12.4) in about a 2:1 ratio by concentration, giving a combined HLB for the mixture of about 7.4.

The drilling fluid typically further contains one or more dissolved inorganic salts. For example, the one or more inorganic salts may be selected from the group consisting of $CaCl_2$, KCl, NaCl, $CaBr_2$, KBr, NaBr, $Ca(NO_3)_2$, $KNO_3$, $NaNO_3$, $CaSO_4$, $K_2SO_4$, $Na_2SO_4$, calcium phosphate, potassium phosphate, sodium phosphate, calcium formate, potassium formate, and sodium formate. $CaCl_2$ is preferred. The inorganic salt is typically present in such concentration as to provide a lower water activity than that of the shale it is to inhibit, and may be in 1 to 3 M solution in the fluid, and preferably is in 2 to 3 M solution.

The one or more viscosifying agents may be selected from biopolymers in the group consisting of, but not limited to, xanthan gum, scleroglucan, whelan gum, guar gum, biozan, diutan, carboxymethyl cellulose, polyanionic cellulose, starch, modified starch, hydrophobically modified variants thereof, and polymeric viscosifying agents such as, but not limited to, polyacrylamide, partially hydrolised polyacrylamide, polyvinylacetate and polyvinyl pyrrolidone. The concentration in the fluid of the one or more viscosifying agents may be in the range 0.5-30 g/l.

In a further aspect, the present invention provides for the use of the fluid of the previous aspect to drill a well.

Figure 2:
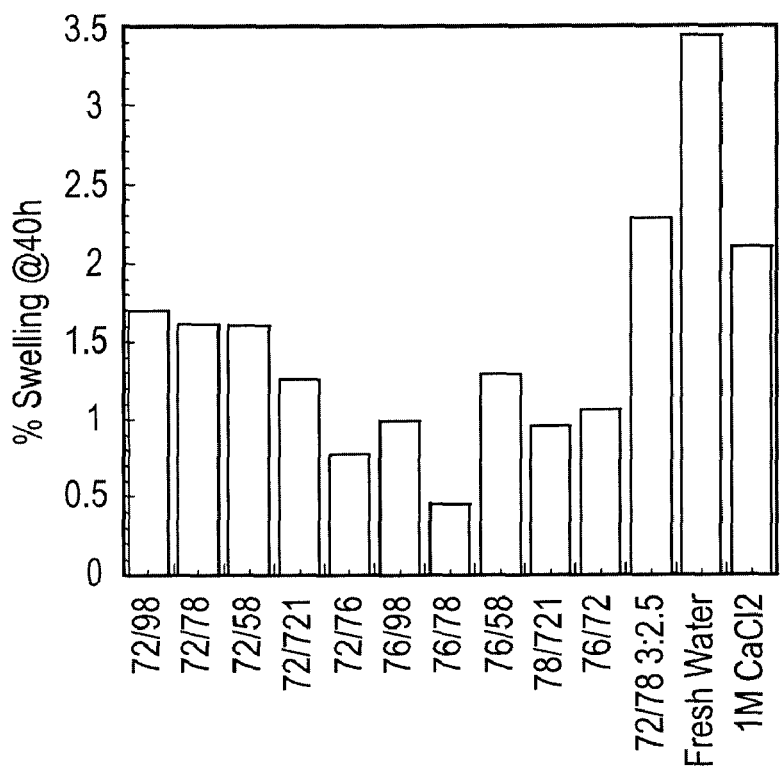
Figure 3:
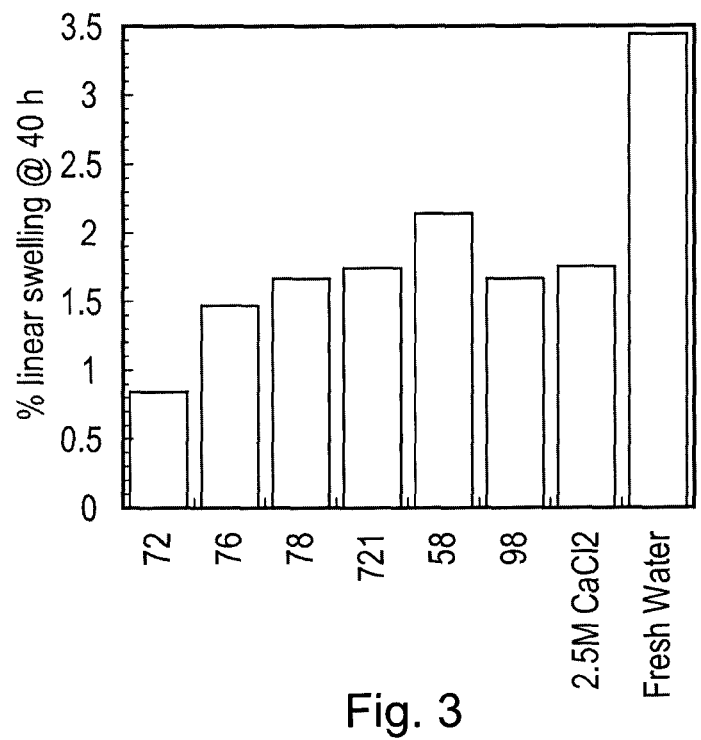
Figure 4:
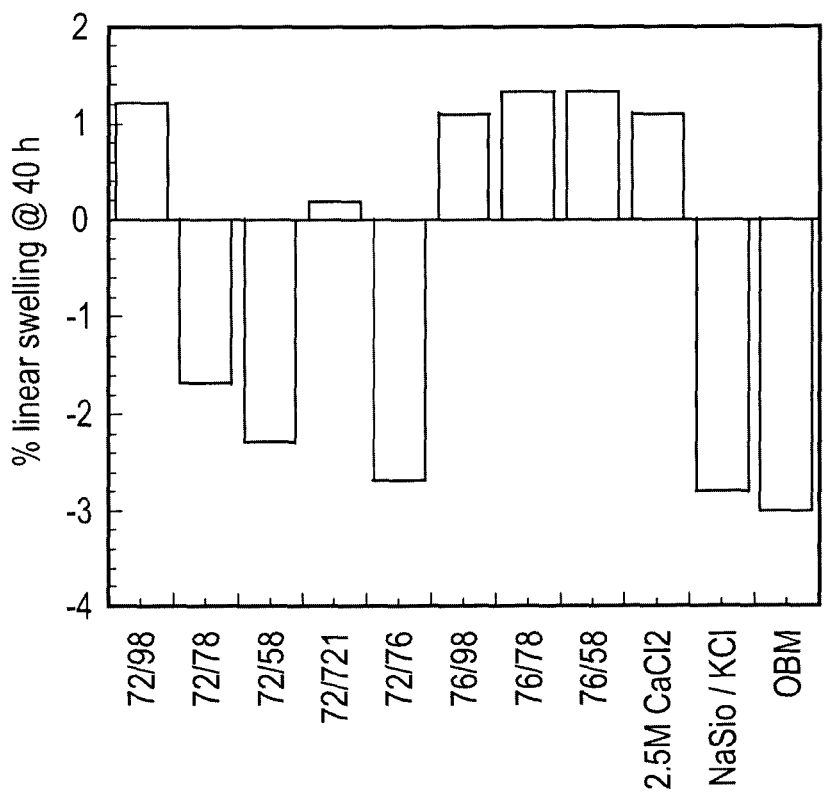
Figure 5:
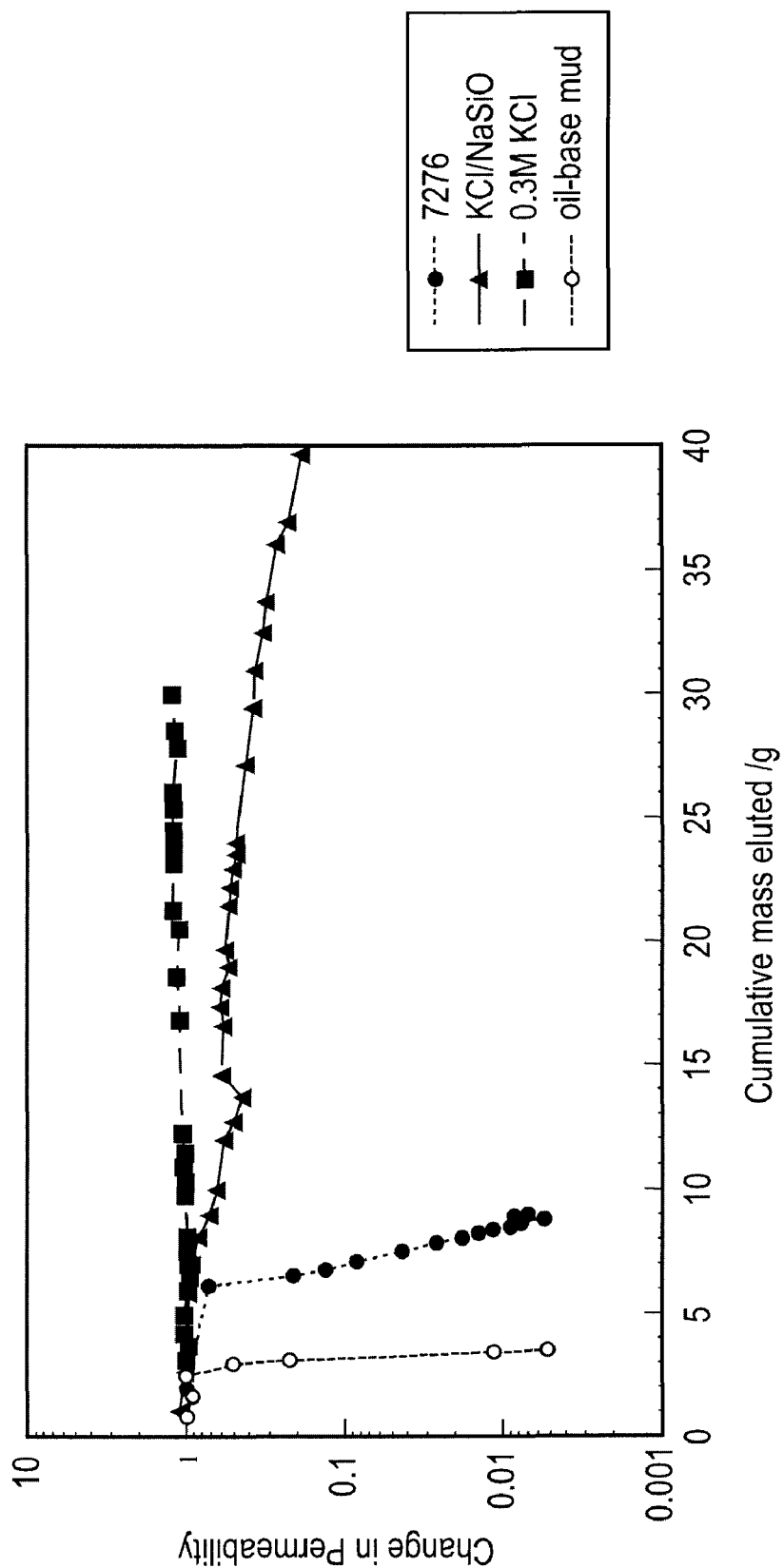

Specific embodiments of the present invention will now be described with reference to the following drawings in which:

FIG. 1 compares the 40 hour swelling of core plugs exposed to surfactant blend test solutions with 1M KCl and fresh water;

FIG. 2 compares the 40 hour swelling of core plugs exposed to surfactant blend test solutions with 1M $CaCl_2$ and fresh water;

FIG. 3 compares the 40 hour swelling of core plugs exposed to individual surfactant test solutions with 2.5M $CaCl_2$ and fresh water;

FIG. 4 compares the 40 hour swelling of core plugs exposed to surfactant blend test solutions with 2.5M $CaCl_2$, a sodium silicate WBM, and an OBM; and FIG. 5 plots the change in porosity against the cumulative mass eluted for a Hassler cell test on a 2.5M $CaCl_2$ aqueous solution containing 2 g/l BRIJ® 72 and 1 g/l BRIJ® 76, and similar plots for corresponding tests on four comparative fluids.

Aqueous solutions containing an individual alkyl ethoxylate surfactant having the formula $RO(CH_2CH_2O)_nH$, or a blend of two such surfactants were prepared from ICI's BRIJ® series. Details of the surfactants used are given in Table 1.

TABLE 1

| Surfactant | R | n | M wt | HLB |
|---|---|---|---|---|
| BRIJ 72 | Stearyl ($C_{18}$) | 2 | 358 | 4.9 |
| BRIJ 76 | Stearyl ($C_{18}$) | 10 | 710 | 12.4 |
| BRIJ 78 | Stearyl ($C_{18}$) | 20 | 1150 | 15.3 |
| BRIJ 721 | Stearyl ($C_{18}$) | 21 | 1194 | 15.5 |
| BRIJ 58 | Cetyl ($C_{16}$) | 20 | 1122 | 15.7 |
| BRIJ 98 | Oleyl ($C_{18\_1}$) | 20 | 1148 | 15.3 |

Each solution had a total surfactant concentration of 3 g/l. Where a blend of two surfactants was used, the blend ratio (by concentration) was generally 2:1. Thus the convention is adopted that, for a given blend, where a ratio is not explicitly indicated, the ratio is 2:1 and the first named surfactant has the higher concentration. So, for example, a 72/98 blend contains 2 g/l of BRIJ 72 and 1 g/l of BRIJ 98. However, where a blend departed from the 2:1 ratio, the ratio of the blend is explicitly given. For example, a 72/78 3:2.5 blend contains 1.6 g/l of BRIJ 72 and 1.4 g/l of BRIJ 78.

All the solutions were thickened with 4 g/l of xanthan gum.

An investigation into the surfactant solutions made use of swelling tests and Hassler cell tests, more details of which can be found in Bailey, L., Craster, B., Sawdon, C., Brady, M., Cliffe, S., *New Insight into the Mechanisms of Shale Inhibition Using Water Based Silicate Drilling Fluids*, IADC/SPE Drilling Conference, 3-6 Mar. 1998, Dallas, Tex., SPE 39401.

For the swelling tests, core plugs were immersed in test solutions and the amount of unconfined linear swelling was measured. The test has previously been used to demonstrate the osmotic response of outcrop shale cores exposed to OBMs and silicate solutions, as well as general levels of inhibition.

A Hassler cell was used to measure the permeability of Oxford clay cores during exposure to different inhibitive fluids. A shale core, diameter and length ~25 mm (cut normal to bedding), was confined radially in a Viton rubber sleeve which isolated it from the hydraulic oil used to apply a confining pressure of 8.6 MPa. Steel end plugs with capscrews held the core in place. These end plugs prevented the core from swelling axially but radial swelling was still possible against the oil pressure. The test fluid was fed to the Hassler cell by a Gilson positive displacement pump at a preset pressure of 8 MPa. The outlet of the Hassler cell was open to the atmosphere. The test fluid entered and left the cell through capillary tubing to minimise dead volume. Permeable fibrous disks at each end of the core allowed the test fluid access to the entire end surfaces of the core while preventing radial flow at the inlet and outlet. Fluid eluted from the core was collected in sample tubes sealed with cling film to prevent evaporation. The mass of eluent collected was used to determine the flow rate through the core. The ionic composition of the eluent was measured by ion chromatography.

Before each experiment, the core was drained at a nominal isotropic stress of 8.5 MPa for at least 72 hours to ensure its stability under the pressures in the test; if left undrained the soft Oxford Clay extruded through the outlet of the Hassler cell. The confining pressure and fluid pressure were increased to the operating levels in steps of approximately 0.5 MPa, ensuring that the confining never exceeded the fluid pressure by more than 1 MPa.

During a test the cores were first exposed to a synthetic pore fluid (0.12M NaCl, 0.01M KCl, 0.04M $MgCl_2$, and 0.04M $CaCl_2$), to establish equilibrium flow conditions. After this, the feed was switched to the test fluid.

At the end of a test the feed pump was stopped and, as the pressure leaked off through the core, the confining pressure was reduced to maintain the differential between confining and fluid pressure. When the applied pressure reached zero, the apparatus was rapidly dismantled and the core removed for post mortem analysis of water and ionic content.

The outcrop shale used for the core swelling and Hassler cell tests was Oxford clay from London Brickworks' Bedford Quarry, The mineralogy is given in Table 2.

TABLE 2

| Mineral | wt % |
| --- | --- |
| Quartz | 17 |
| K-feldspar | 7 |
| Pyrite | 5 |
| Gypsum | 1 |
| Smectite | — |
| Illite-Smectite | 17 |
| Illite | 30 |
| Kaolinite | 18 |
| Chlorite | 7 |
| Typical moisture content | 20 |

FIG. 1 compares the 40 hour swelling of core plugs exposed to surfactant blend test solutions with 1M KCl and fresh water; FIG. 2 compares the 40 hour swelling of core plugs exposed to surfactant blend test solutions with 1M $CaCl_2$ and fresh water; FIG. 3 compares the 40 hour swelling of core plugs exposed to individual surfactant test solutions with 2.5M $CaCl_2$ and fresh water; and FIG. 4 compares the 40 hour swelling of core plugs exposed to surfactant blend test solutions with 2.5M $CaCl_2$, a sodium silicate WBM (an aqueous solution containing 8 g/l KCl and the sodium silicate), and an OBM.

The surfactant solutions were effective inhibitors, reducing the degree of swelling observed. Particularly at high salt concentrations, see for example FIG. 4, the most effective blends are those with a higher proportion of a lower HLB surfactant. Indeed, certain blends caused the core to shrink (as did the sodium silicate WBM and the OBM). In general we find the more hydrophobic combinations more effective, particularly those with an HLB<9.

Comparison of FIGS. 3 and 4 suggests that the solutions containing blends are more effective inhibitors than solutions containing individual surfactants.

Turning to the Hassler cell tests, FIG. 5 shows a comparison between a test using the most effective surfactant blend (2 g/l BRIJ 72 with 1 g/l BRIJ 76, giving $HLB_{Blend}$=7.4 in 2.5M with tests using the sodium silicate/KCl WBM, 0.3M KCl aqueous solution, a WBM containing 14 g/l KCl, and an OBM. FIG. 5 plots the change in porosity for the respective test against the cumulative mass eluted. Table 3 summarises the extent of permeability reduction with these systems, as well as two common glycol systems (Dowell Drilling Fluids Staplex 500™ in 8 g/l KCl aqueous solution, and BP DCP® 101 in 8 g/l KCl aqueous solution) and 1.4M KCl aqueous solution. The table includes a calculation of the approximate pore volumes of invasion to cause the reduction, and the results of post mortem water content analyses of the cores.

TABLE 3

| System | % Change in permeability | Approx. pore volumes eluted | % Post mortem water content |
| --- | --- | --- | --- |
| 0.3 M KCl | 118 | 5 | 25-21 |
| 1.4 M KCl | 142 | 12 | 24-19 |
| Staplex 500 | 89 | 5 | 22-18 |
| DCP ® 101 | 54 | 6 | 22-16 |
| NaSiO | 18 | 11 | 20-16 |
| OBM | 0.5 | 1 | 14 |
| 72/76 | 0.7 | <2 | 13.8 |

Unlike the silicate systems, where a gradual reduction in permeability occurs over several pore volumes, there is a sudden and dramatic drop in permeability on the introduction of the 72/76 solution, after only slightly more than 1 pore volume was eluted from the core. This is similar to the behaviour seen with OBMs. Despite an extended test time, (approaching several months) neither the OBM nor the 72/76 solution achieved true equilibrium, but the apparent permeability had dropped to 0.5-0.7% of the initial permeability.

The post mortem water content analysis of the core for the 72/76 solution revealed a water content around 13.8%, uniform down the length of the core, which is similar to the post mortem water content of the core for the OBM. In contrast, the glycol (Staplex 500 and DCP® 101) and sodium silicate systems resulted in non uniform water profiles, ranging from 23% to 16% from inlet to outlet of the respective core.

Based on the above, example drilling fluid formulations were developed.

EXAMPLE 1

Water 1 Litre, $CaCl_2$ to 2.5M, 1-5 g xanthan gum, 10-30g low viscosity grade polyanionic cellulosic polymer, 10-30 g starch, 20 g BRIJ 72, 10 g BRIJ 721. API barite weighting agent added to obtain desired fluid density. Biocide, and antifoam agent (e.g. Defoam X or Defoam A from M-I) also added.

EXAMPLE 2

Water 1 Litre, $CaCl_2$ to 2.5M, 1-5 g scleroglucan (e.g. BIOVIS®), 10-30 g modified starch (e.g. DualFlo), 20 g BRIJ 72, 10 g BRIJ 721. Calcium carbonate weighting agent (e.g. SafeCarb) added to obtain desired fluid density. Biocide, and antifoam agent (e.g. Defoam X or Defoam A from MI) also added.

In both examples, the quantities of viscosifying and fluid loss agents can be adjusted to achieve required rheology.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All the references cited herein are incorporated by reference.

What is claimed is:

1. A water based drilling fluid containing as additive two alkyl ethoxylates having the formula $RO(CH_2CH_2O)_nH$ and different hydrophilic-lipophilic balance values;
   wherein:
   R is a $C_{16-22}$ alkyl group, and
   n is an integer in the range 2-30;

the fluid further containing one or more viscosifying agents, and being clay-free;

the alkyl ethoxylates have a combined hydrophilic-lipophilic balance value of less than 9; and the concentration in g/l of the alkyl ethoxylate with a lower hydrophilic-lipophilic balance value is at least 1.5 times greater than the concentration in g/l of the alkyl ethoxylate with the higher hydrophilic-lipophilic balance value.

2. A water based drilling fluid according to claim 1, wherein R is a $C_{16-18}$ alkyl group.

3. A water based drilling fluid according to claim 1, wherein n is the range 2-21.

4. A water based drilling fluid according to claim 1, wherein the concentration in the fluid of the one or more alkyl ethoxylates is in the range 1-5 g/l.

5. A water based drilling fluid according to claim 1, further containing one or more dissolved inorganic salts.

6. A water based drilling fluid according to claim 5, wherein the one or more inorganic salts are selected from the group consisting of $CaCl_2$, KCl, NaCl, $CaBr_2$, KBr, NaBr, $Ca(NO_3)_2$, $KNO_3$, $NaNO_3$, $CaSO_4$, $K_2SO_4$, $Na_2SO_4$, calcium phosphate, potassium phosphate, sodium phosphate, calcium formate, potassium formate, and sodium formate.

7. A water based drilling fluid according to claim 5, wherein the inorganic salt is in 1 to 3 M solution in the fluid.

8. A water based drilling fluid according to claim 1, wherein the one or more viscosifying agents are selected from the group consisting of xanthan gum, scleroglucan, whelan gum, guar gum, biozan, diutan, carboxymethyl cellulose, polyanionic cellulose, starch, modified starch, hydrophobically modified variants thereof, and polymeric viscosifying agents.

9. A water based drilling fluid according to claim 1, wherein the concentration in the fluid of the one or more viscosifying agents is in the range 0.5-30 g/l.

10. A method of drilling a well comprising the step of pumping the drilling fluid of claim 1 down a drill string.

* * * * *